Mar. 6, 1923. Re. 15,556

J. A. TOPPING

ROOF AND MEANS FOR SECURING SHINGLES TO A ROOF

Original Filed Mar. 18, 1921

Inventor:
JOHN A. TOPPING
By Jonée Bain & Hinkle
Attys

Reissued Mar. 6, 1923. Re. 15,556

UNITED STATES PATENT OFFICE.

JOHN A. TOPPING, OF NYACK, NEW YORK.

ROOF AND MEANS FOR SECURING SHINGLES TO A ROOF.

Original No. 1,430,338, dated September 26, 1922. Serial No. 453,434, filed March 18, 1921. Application for reissue filed November 2, 1922. Serial No. 598,638.

*To all whom it may concern:*

Be it known that I, JOHN A. TOPPING, a citizen of the United States, residing at Nyack, in the county of Rockland and State of New York, have invented certain new and useful Improvements in Roofs and Means for Securing Shingles to a Roof, of which the following is a specification.

This invention relates to improvements in roofs and means for securing shingles to a roof.

One of the objects of the invention is to secure the weather exposed or butt ends of shingles firmly to a roof without bending or perforating the shingles at such ends.

Another object is to provide a clamp, for securing the lower or butt ends of shingles to a roof so that they will not be affected by wind or storm; which holds the superimposed shingle firmly in place by nails used to secure the subjacent shingles on the roof.

Another object is to supply means for clamping or securing to the roof the exposed angular end of a shingle without perforating any part of the shingles with the clamping means.

Another object is to prevent the shingles from warping, curving or being lifted.

Other, further and more specific objects of the invention will become readily apparent, to persons skilled in the art, from a consideration of the following description when taken in conjunction with the accompanying drawings, wherein:—

In both views the same reference characters are employed to indicate similar parts.

The clamp 5 may well be made of a single piece of tinned or galvanized wire having a member 6 which may occupy a horizontal position on the roof, and angularly disposed arms 7 and 8 terminating in eyes 9 and 10, respectively. The interior of the eyes are preferably just large enough to freely admit the shank of the shingle nail without permitting the head to pass therethrough.

Figure 1:
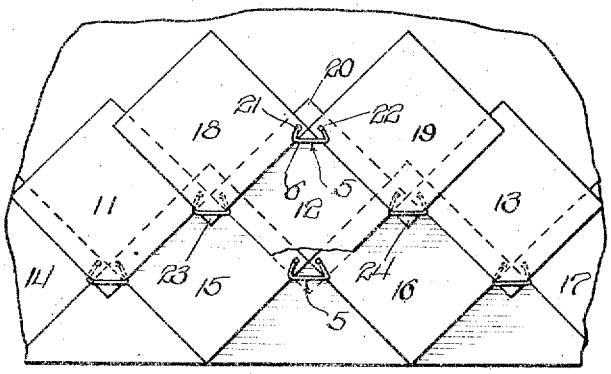
Fig. 1 is a plan view of a part of a roof showing my shingle securing means in place with parts broken away to show its means of attachment to the roof.
Figure 2:
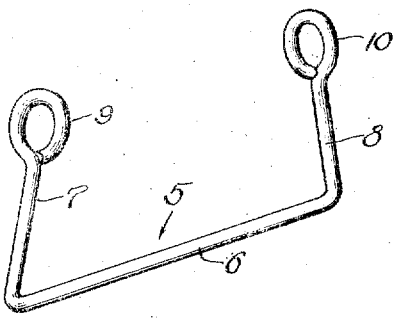
Fig. 2 is a plan view of one form of clamp that may be used in carrying my invention into effect.

In Fig. 1 I have shown a portion of a roof of a design in which the lower angular ends of the shingles are firmly held to the roof by my improved means.

In the particular example the shingles are substantially square in outline with opposite corners in vertical and in horizontal planes, respectively.

Shingles 11, 12, and 13 constitute parts of one course. These shingles overlie shingles, 14, 15, 16 and 17, of the course below and are overlain by shingles 18 and 19 of the course above.

As an example of the mode of laying the shingles it will be observed that shingles 18 and 19 overlap shingles 11, 12 and 13. Shingle 12 is shown projecting above the meeting points of shingles 18 and 19, as at 20. Nails 21 and 22 are placed in the eyes 9 and 10, respectively, and driven through shingles 18 and 12, and 19 and 12, respectively.

In laying the next course above the course containing shingles 18 and 19, the lower point or butt end of the shingle to be placed above is stuck under the horizontal member 6 of the clamp, as clearly shown at 23 and 24.

The superimposed shingle covers the nails 21 and 22 and the members 7 and 8 of the clamp leaving the horizontal member 6 overlying the lower angular butt of the shingle subsequently placed in position.

It will be noted that the device which holds the butt ends of the shingles of one course is held in place by the nails employed to attach the previously applied course.

The clamp herein shown, if made of good quality of galvanized or tinned wire, will last as long as the shingles remain serviceable.

While the part 6 serves to hold down securely to the roof support the angular end of the shingle that covers the parts 7 and 8, and the eyes 9 and 10, these parts serve to assist the nails in holding down the shingles perforated by the nails by increasing the extent of the overlying holding surfaces.

While I have shown one form of device which may conveniently be used for carrying my invention into effect, it will be manifest that changes may be made in the configuration and disposition of the parts within the scope of the appended claims.

Having described my invention what I claim as new and desire to secure by Letters Patent, is:—

1. Means for securing the exposed or butt ends of shingles to roofs without perforating said ends, comprising a fastening member having parts secured to the roof support by nails used to secure shingles of a previous course in place and an intervening part overlying and extending across the lower butt end of a superimposed shingle.

2. Means for securing the exposed or butt ends of shingles to a roof without perforating said ends comprising a holding device having a horizontal member and two angularly related end members, each of the latter bent into an eye to receive a nail, said end members when in place on a roof being held by nails used to attach adjacent shingles of a course and the horizontal member overlying and extending across the butt end of a shingle of a subsequently applied course which shingle covers the terminal ends of the device.

3. A shingle holding means comprising a one-piece device having a horizontal member and ends disposed at substantial right angles thereto, said ends each having a nail receiving eye.

4. A shingle holding means comprising a U-shaped clip having an eye in each of its ends to receive nails; the yoke of the clip when in place extending across the end of a shingle and the ends of the clip extending under said shingle.

5. A roof, comprising a series of shingles laid in superposed courses, and a series of clamps secured in place beneath a given course of shingles, each clamp extending transversely across the surface of the butt of a shingle of that course and holding two shingles of the subjacent course in place.

6. A roof composed of a series of shingle elements having exposed laterally tapering butts and laid in overlapping courses, the shingle element of each course secured to the roof, and means for holding down the apex of each exposed butt comprising a member secured to two subjacent shingles of the roof and extending entirely across the butt of a superposed shingle beneath which said butt is removably insertable.

7. A roof composed of a series of shingle elements having exposed laterally tapering butts and laid in overlapping courses, means for securing the shingle elements of two adjacent courses to the roof including a holding device secured to two adjacent shingles of an underlying course of the roof and having parts to engage the side edges of the butts of a superposed course serving as guides and stops, and to engage the top of said butts to retain the butt down against the subjacent element.

8. A roof composed of shingle elements having exposed laterally tapering butts and laid in overlapping courses, in combination with means for holding down the side apices of adjacent underlying shingles and the respective exposed butts of a superposed course comprising a separate, independent clamp for each butt, each clamp having spaced members with an intermediate portion between which said tapered butts are removably insertable.

9. In a roof, the combination of four shingles, two set point downward side by side, leaving a V-shaped space between them, one lying beneath the V shaped space, and overlapped by the sides of said two shingles, and the fourth lying directly above the overlapped shingle on the roof with its point overlying the apex of the said V shaped space, and securing nails extending down through the two side by side shingles, and the overlapped shingle near the apex of the V, and means carried by said nails, and adapted to form a receptacle within which the apex of the fourth shingle is inserted.

10. In a roof, the combination of four shingles, two set point downward side by side, leaving a V shaped space between them, one lying beneath the V shaped space, and overlapped by the sides of said two shingles, and the fourth lying directly above the overlapped shingle on the roof with its point overlying the apex of the said V shaped space, and securing nails extending down through the two shingles, and the overlapped shingle near the apex of the V, and means carried by said nails, and adapted to form a receptacle within which the apex of the fourth shingle is inserted, said means comprising a strap secured at its ends to the said nails.

In testimony whereof I have hereunto subscribed my name.

JOHN A. TOPPING.